United States Patent
Suda

Patent Number: 6,067,115
Date of Patent: May 23, 2000

[54] AUTO-FOCUS ADJUSTING APPARATUS SUCH AS FOR A VIDEO CAMERA

[75] Inventor: Hirofumi Suda, Yokohama, Japan

[73] Assignee: Canon Kabushiki Kaisha, Tokyo, Japan

[21] Appl. No.: 08/676,871

[22] Filed: Jul. 3, 1996

Related U.S. Application Data

[63] Continuation of application No. 08/496,812, Jun. 29, 1995, Pat. No. 5,534,923, which is a continuation of application No. 08/074,944, Jun. 10, 1993, abandoned.

[30] Foreign Application Priority Data

Jun. 11, 1992 [JP] Japan .................................. 4-177422

[51] Int. Cl.[7] ...................................................... H04N 5/232
[52] U.S. Cl. ......................................... 348/350; 348/354
[58] Field of Search ..................................... 348/207, 345, 348/349, 350, 354, 355, 356; 396/121, 122, 123, 124; H04N 5/242

[56] References Cited

U.S. PATENT DOCUMENTS

| | | | |
|---|---|---|---|
| 4,969,045 | 11/1990 | Haruki et al. | 348/365 |
| 4,985,777 | 1/1991 | Kawada | 348/353 |
| 4,994,920 | 2/1991 | Fujiwara et al. | 348/349 |
| 5,126,849 | 6/1992 | Senuma et al. | 348/353 |
| 5,182,649 | 1/1993 | Miyazaki | 348/349 |
| 5,192,998 | 3/1993 | Tokumitsu et al. | 348/349 |

*Primary Examiner*—Tuan Ho
*Attorney, Agent, or Firm*—Morgan & Finnegan L.L.P.

[57] ABSTRACT

A video camera apparatus in which a signal of a certain frequency is extracted from an image pickup signal from an image pickup element such as CCD by a band-pass filter, a difference between the maximum and minimum values of the frequency of the image pickup signal is detected by a detecting circuit, the extraction value extracted by a band-pass filter is divided by the detection value detected by the detecting circuit by a normalizing circuit, thereby normalizing a focus estimation value, and a focus adjusting lens is moved by a lens driving motor on the basis of the normalized focus estimation value, thereby executing an automatic focus adjustment.

11 Claims, 9 Drawing Sheets

FIG. 6

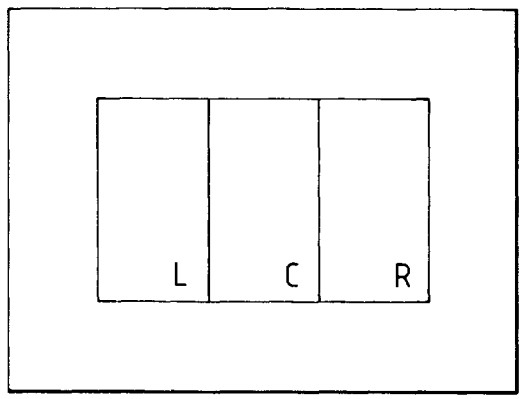

FIG. 11

| | CONDITION | ESTIMATION ALGORITHM |
|---|---|---|
| ① | L ≅ C ≅ R | USE ALL L, C AND R AS FOCUS DETECTION AREAS AND MAKE ESTIMATION VALUE BY SUMMING OR AVERAGING ESTIMATION VALUES OF L, C AND R AREAS |
| ② | L < C, R < C | USE C AS FOCUS DETECTION AREA TO USE ESTIMATION VALUE OF C, OR MAKE WEIGHTING OF C LARGER THAN L AND R |
| ③ | L > C, R > C | USE L AND R AS FOCUS DETECTION AREAS TO USE AVERAGE OR SUM OF ESTIMATION VALUES OF L AND R, OR MAKE WEIGHTING OF L AND R LARGER AND MAKE WEIGHTING OF C SMALLER |

AUTO-FOCUS ADJUSTING APPARATUS SUCH AS FOR A VIDEO CAMERA

This is a continuation application Ser. No. 08/496,812 filed Jun. 29, 1995, now U.S. Pat. No. 5,534,923, which is a continuation of application of application Ser. No. 08/074,944 filed Jun. 10, 1993 abandoned.

BACKGROUND OF THE INVENTION

1. Field of the Invention

The present invention relates to a video camera apparatus and, more particularly, to an automatic focus adjusting apparatus which is suitable for use in a video camera apparatus.

2. Related Background Art

In a camera such as a video camera or the like, there has conventionally been known an automatic focus adjusting method called a mountain-climbing method whereby a high frequency component in an image pickup signal which is obtained from an image pickup element such as a CCD or the like is extracted and a focus adjusting lens is moved so that the high frequency component becomes maximum, thereby adjusting a focal point. Such an automatic focus adjusting method has advantages such that a special optical member for focus adjustment is unnecessary and a focal point can be accurately adjusted to an in-focus state irrespective of a near or far distance and the like. The automatic focus adjusting method of such a kind of conventional video camera will now be described with reference to FIG. 1.

FIG. 1 is a block constructional diagram of a conventional camera. In the diagram, reference numeral 1 denotes a focusing lens to adjust a focal point. The focusing lens 1 is reciprocated in the direction of an optical axis L by a lens driving motor 2, thereby adjusting a focal point. The light which has transmitted through the focusing lens 1 reaches an image pickup element (CCD) 3 and an image is formed on the image pickup surface of the CCD 3, by which the light image is photoelectrically converted into the electric signal. The electric signal is sampled and held by a sample-hold circuit (CDS) 4. After that, an output signal of the CDS 4 is amplified by an amplifying circuit (AGC) 5 to a proper level. The amplified signal is subsequently supplied to a processing circuit (not shown) and to a band-pass filter (BPF) 7.

The BPF 7 extracts the high frequency component in the video signal. Only the signal corresponding to the portion which has been set into a focus detection area in a picture plane is extracted by a gate circuit 8. The peak value of the extracted signal from the gate circuit 8 is held by a peak-hold circuit 9 at an interval synchronized with a vertical sync signal. After that, peak holding signal is supplied as a focus estimation value to a microcomputer 10. A command signal is supplied to a motor driver 11 and the motor 2 is driven on the basis of the focus estimation value in a direction such that when the focus estimation value is small, namely, in case of a large out-of focusing state, the automatic focus adjusting operation is rapidly executed, and in case of a small out-of focusing state, the automatic focus adjusting operation is slowly performed, and that the focus estimation value is always set to a large value. That is, what is called a mountain-climbing control which has conventionally been well known is executed.

In the above conventional video camera, however, since the automatic focus adjusting operation is performed on the basis of an output of the band pass filter 7, in the case where a contrast, a brightness, or the like of an object extremely differs, it is difficult to similarly execute the operations under all of the conditions.

The above point will now be described with reference to FIG. 3. FIG. 3 is a diagram showing a change in output of the peak-hold circuit 9 when the focusing lens 1 has been searched and moved from the shortest position to the infinite ($\infty$) position. In the diagram, a curve A shows output characteristics when an object of an extremely high contrast has been photographed. An extremely high output is generated at the in-focus point. On the other hand, a curve B shows output characteristics when an object of a low contrast has been photographed. A large output is not generated even at the in-focus point.

When the focusing lens 1 is moved so as to be optimally adjusted to the mountain of the curve A, an inconvenience such as hunting or the like occurs in the automatic focus adjusting operation in case of the mountain of the other curve B. On the contrary, when the focusing lens 1 is moved so as to be optimally focused to the mountain of-the other curve B, an inconvenience such that the automatic focusing operating speed is slow occurs in case of the mountain of the curve A.

SUMMARY OF THE INVENTION

The invention is made in consideration of the above circumstances and it is the first object of the invention to provide a video camera which promptly executes a good automatic focus adjusting operation without causing a hunting even for any object.

Another object of the invention is to realize a high accurate and stable automatic focus adjusting operation by accurately detecting a focus signal irrespective of a photographing situation.

To accomplish the above objects, according to a preferred embodiment of the invention, there is disclosed a video camera comprising: extracting means for extracting a signal of a predetermined frequency from an image pickup signal generated from image pickup means; detecting means for detecting a difference between the maximum value and the minimum value of the level of the image pickup signal; normalizing means for normalizing a focus estimation value by dividing the extraction value extracted by the extracting means by the detection value detected by the detecting means; and lens moving means for moving a focus adjusting lens to an in-focus point on the basis of the focus estimation value normalized by the normalizing means.

Due to this, a signal of a certain frequency is extracted by the extracting means from the image pickup signal generated from the image pickup means. A difference between the maximum value and the minimum value of the frequency of the image pickup signal is detected by the detecting means. The focus estimation value is normalized by the normalizing means by dividing the extraction value extracted by the extracting means by the detection value detected by the detecting means. The focus adjusting lens is moved to the in-focus point by the lens moving means on the basis of the focus estimation value normalized by the normalizing means, so that the high accurate and stable automatic focus adjustment is executed.

According to another preferred embodiment of the invention, there is disclosed a video camera comprising: extracting means for extracting a signal of a certain frequency from an image pickup signal generated from image pickup means; detecting means for detecting the maximum value in a vertical period of time regarding a difference between the maximum value and the minimum value in the same horizontal line as the frequency of the image pickup signal; normalizing means for normalizing a focus estimation value by dividing the extraction value extracted by the extracting means by the detection value detected by the detecting means; and lens moving means for moving a focus adjusting lens of an optical system on the basis of a focus estimation value normalized by the normalizing means.

Due to this, the signal of a certain frequency is extracted by the extrating means from the image pickup signal generated from the image pickup means. The maximum value in the vertical period of time regarding the difference between the maximum value and the minimum value in the same horizontal line as the frequency of the image pickup signal is detected by the detecting means. The focus estimation value is normalized by the normalizing means by dividing the extraction value extracted by the extracting means by the detection value detected by the detecting means. The focus adjusting lens is moved to the in-focus point by the lens moving means on the basis of the focus estimation value normalized by the normalizing means, so that the automatic focus adjustment is performed.

According to another preferred embodiment of he invention, there is disclosed a video camera comprising: extracting means for extracting a signal of a certain frequency from an image pickup signal generated from image pickup means; peak-hold means for holding the maximum value of the frequency extracted by the extracting means; detecting means for detecting a difference between the maximum value and the minimum value in the same horizontal line as the frequency of the signal held by the peak-hold means; normalizing means for normalizing a focus estimation value by dividing the extraction value extracted by the extracting means by the detection value detected by the detecting means; and lens moving means for moving a focus adjusting lens of an optical system to an in-focus point on the basis of the focus estimation value normalized by the normalizing means.

Due to this, the signal of a certain frequency is extracted by the extracting means from the image pickup signal generated from the image pickup means. The maximum value of the frequency of the signal extracted by the extracting means is held by the peak-hold means. The difference bewteen the maximum value and the minimum value of the same horizontal line as the frequency of the signal held by the peak holding means is detected by the detecting means.

By dividing the extraction value extracted by the extracting means by the detection value detected by he detecting means by the normalizing means, the focus estimation value is normalized. On the basis of the focus estimation value normalized by the normalizing means, the focus adjusting lens is moved to the in-focus point by the lens moving means, so that the automatic focus adjustment is executed.

BRIEF DESCRIPTION OF THE DRAWINGS

FIG. 6 shows each gate circuit of L, C, and R in a picture of the video camera;

FIG. 11 is a diagram showing control algorithms of focus detection areas L, C, and R.

DETAILED DESCRIPTION OF THE PREFERRED EMBODIMENTS

Embodiments of the present invention will now be described hereinbelow with reference to the drawings.

First Embodiment

Figure 2:
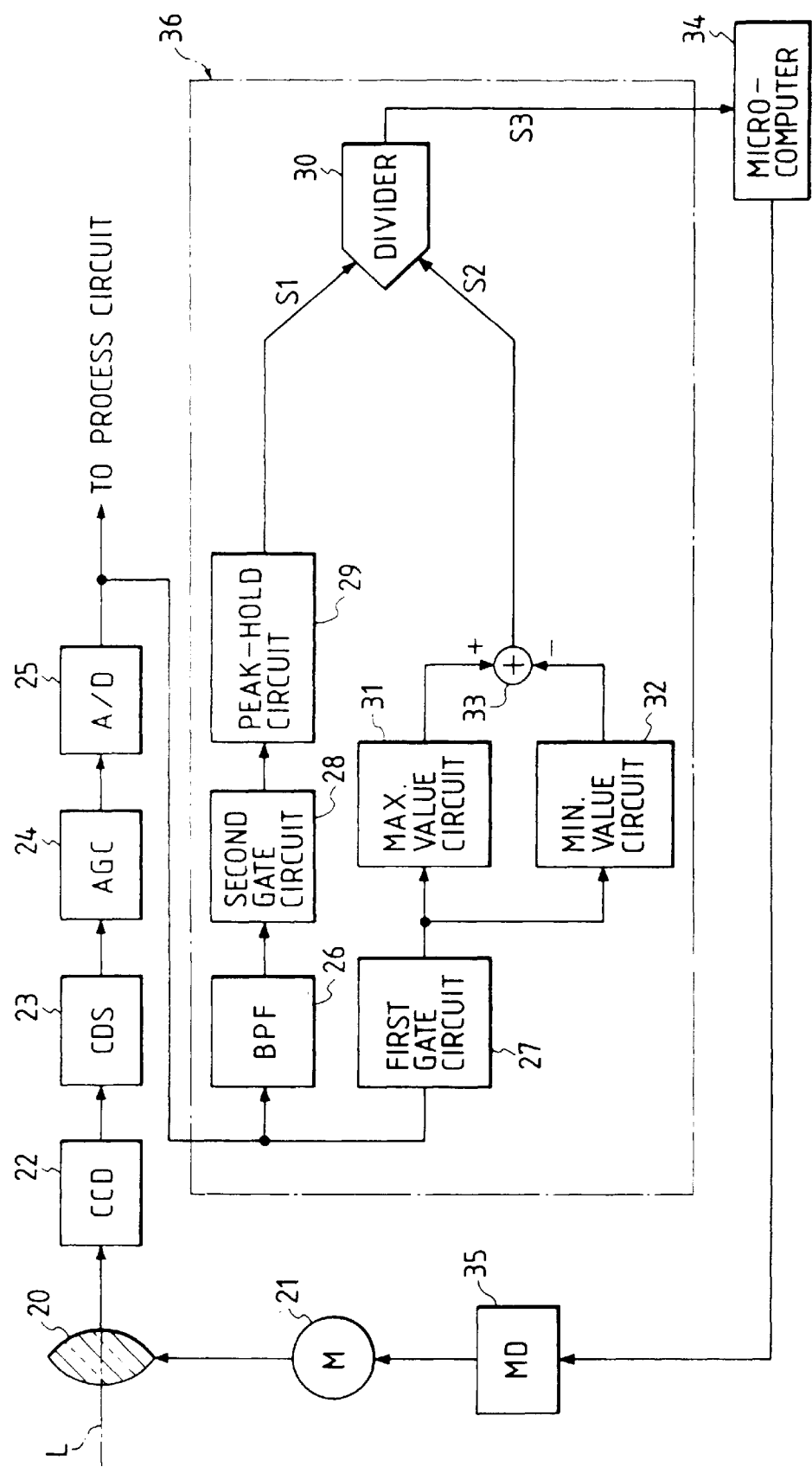
FIG. 2 is a block constructional diagram of a video camera according to the first embodiment of the invention.

FIG. 2 is a block constructional diagram of a camera according to the first embodiment of the present invention. In the diagram, reference numeral 20 denotes a focusing lens (focus adjusting lens). The focusing lens 20 is reciprocated in the directions of an optical axis L by a lens driving motor (lens moving means) 21, thereby performing a focus adjustment. The light which has been transmitted through the focusing lens 20 reaches an image pickup element (CCD) 22 as image pickup means and an image is formed on the image pickup surface of the CCD 22. The image light is photo-electrically converted into the electric signal by the CCD 22. The electric signal is sampled and held by a sample-hold circuit (CDS) 23 and amplified by an amplifier (AGC) 24 to a proper gain. After that, the amplified signal is converted into the digital signal by an analog-digital converter (A/D) 25. The digital signal is supplied to a camera processing circuit (not shown) and to a band-pass filter (BPF) 26 and a first gate circuit 27, respectively. An extraction range on the picture plane by the first gate circuit is set to the same as the range on the picture plane which is extracted by a second gate circuit, which will be explained hereinbelow, or is wider than an extraction range of the second gate circuit.

The band-pass filter (extracting means) 26 extracts the high frequency component in the digital signal. A second gate circuit 28 extracts only the portions necessary for the focus detection in the picture plane and supplies to a peak-hold circuit (peak-hold means) 29. The peak-hold circuit 29 peaks and holds the input signal for a vertical period of time (hereinafter, referred to as a V period) during which a video signal is produced, so that a signal $S_1$ of an automatic focus estimation value is formed and supplied to a numerator side terminal of a divider (normalizing means) 30. The peak-hold circuit 29 is reset in response to a leading edge of each V period.

On the other hand, in the signal supplied to the first gate circuit 27, the maximum value in one V period is held by a maximum value circuit 31 and the minimum value in one V period is held by the minimum value circuit 32. In an adder (detecting means) 33, by subtracting the minimum value from the maximum value, a signal $S_2$ corresponding to a difference between the maximum value and the minimum value is obtained. The signal $S_2$ is supplied to a denominator side terminal of the divider 30. The divider 30 performs a division in response to a trailing edge of the V period. A signal $S_3$ indicative of an automatic focus estimation value in the V period is sent to a microcomputer 34. On the basis of an output signal from the divider 30, the microcomputer 34 drives the lens driving motor 21 through a motor driver (MD) by what is called a mountain-climbing control so as to increase such an output signal. Due to this, the focusing lens 20 is moved in the direction of the optical axis L and the automatic focus adjusting operation is executed. An arithmetic operating circuit 36 for gating is constructed by: the band-pass filter 26; first gate circuit 27; second gate circuit 28; peak-hold circuit 29; divider 30; maximum value circuit 31; minimum value circuit 32; and adder 33.

Figure 3:
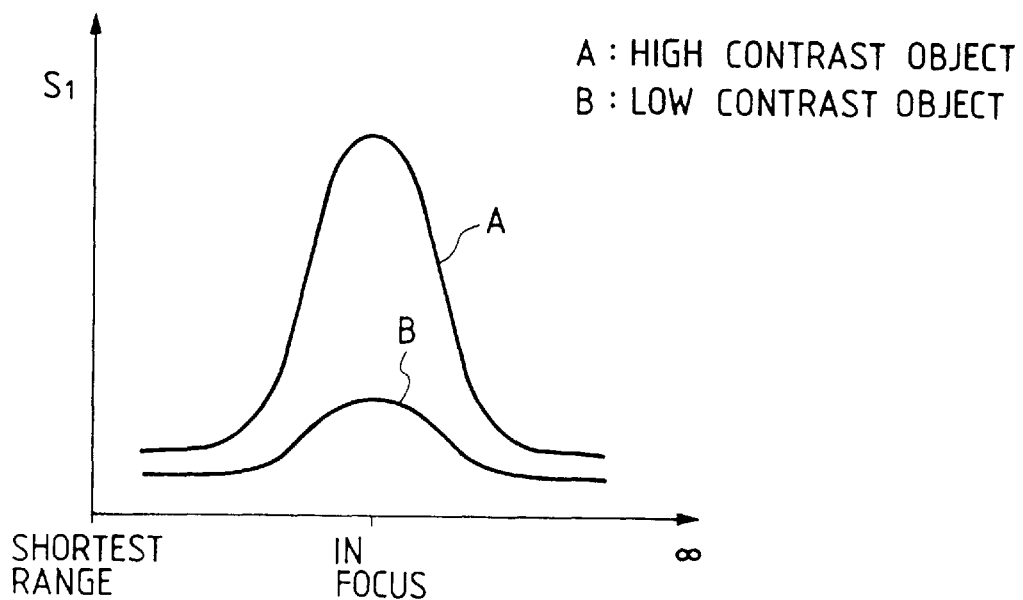
FIG. 3 is a diagram showing a change in a non-normalized output of a peak-hold circuit when a focus adjusting lens in a video camera in FIG. 2 has been searched and moved from the shortest position to the infinite position.
Figure 4:
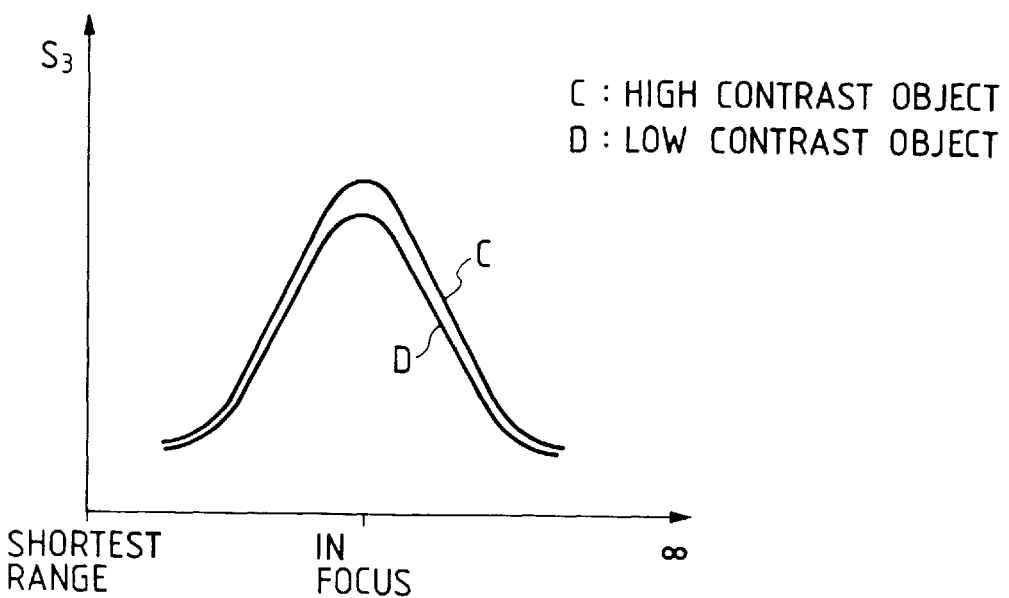
FIG. 4 is a diagram showing a change in normalized output of the peak-hold circuit when the focus adjusting lens in the video camera in FIG. 2 has been searched and moved from the shortest position to the infinite position.

FIGS. 3 and 4 are comparison diagrams showing the automatic focus estimation value $S_3$ normalized by the divider 30 and the automatic focus estimation value $S_1$ before it is normalized. As shown in FIG. 3, in the estimation value $S_1$ before it is normalized, the output level extremely changes due to high/low contrasts of an object, so that shape of mountains and heights of vertexes are also largely different as shown by the curves A and B. However, in case of the normalized estimation value $S_3$ as shown in FIG. 4, shapes of mountains and heights of vertexes of a curve C are similar to those of a curve D.

In FIGS. 3 and 4, the curves A and C show objects of high contrasts and curves B and D show changing characteristics of objects of low contrasts.

Second embodiment

The second embodiments of the invention will now be described with reference to FIGS. 4 and 5.

In the embodiment, the same portions as those shown in the foregoing first embodiment are designated by the same reference numerals and will be explained.

Figure 1:
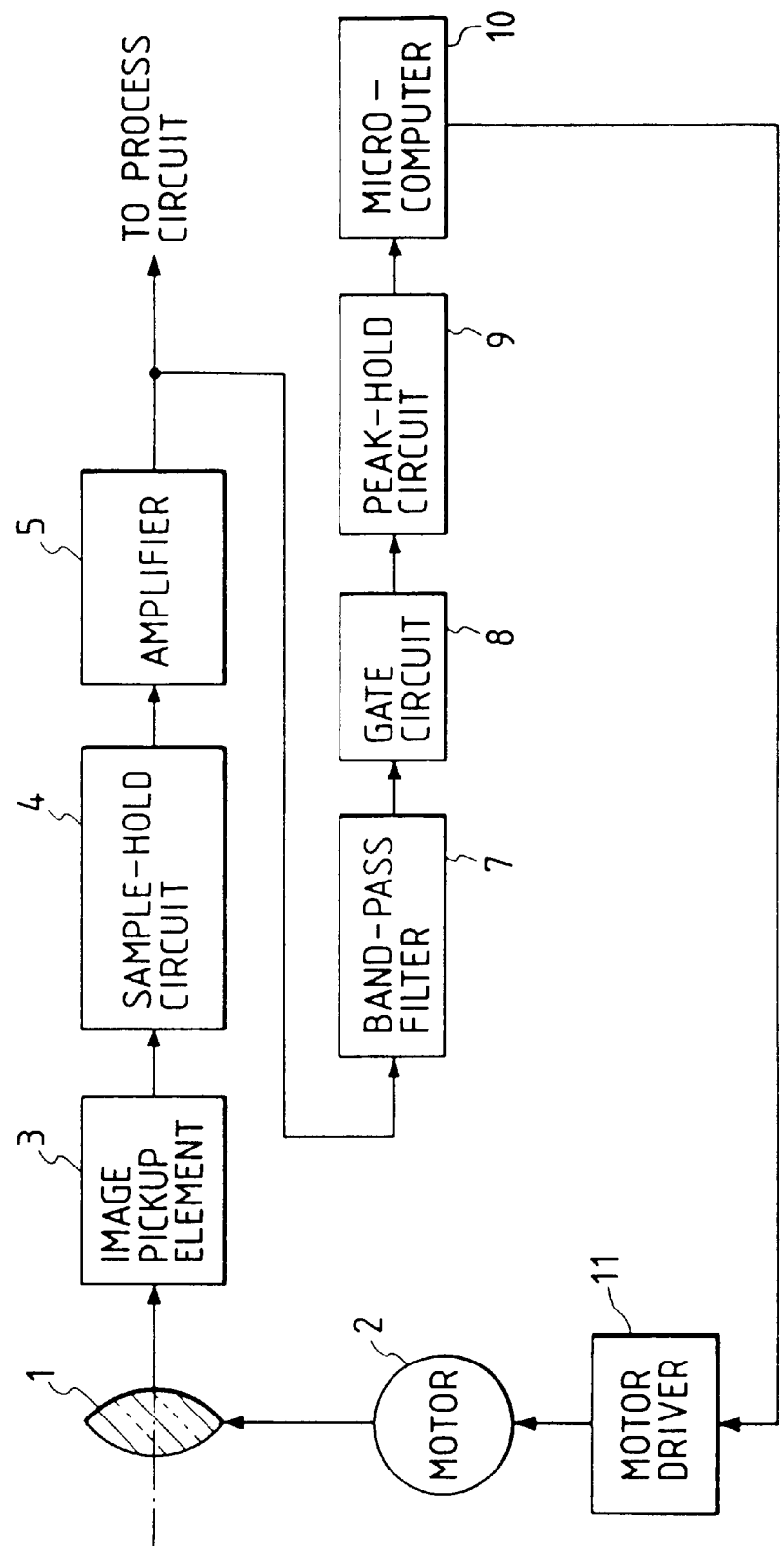
FIG. 1 is a block diagram of a general video camera.
Figure 5:
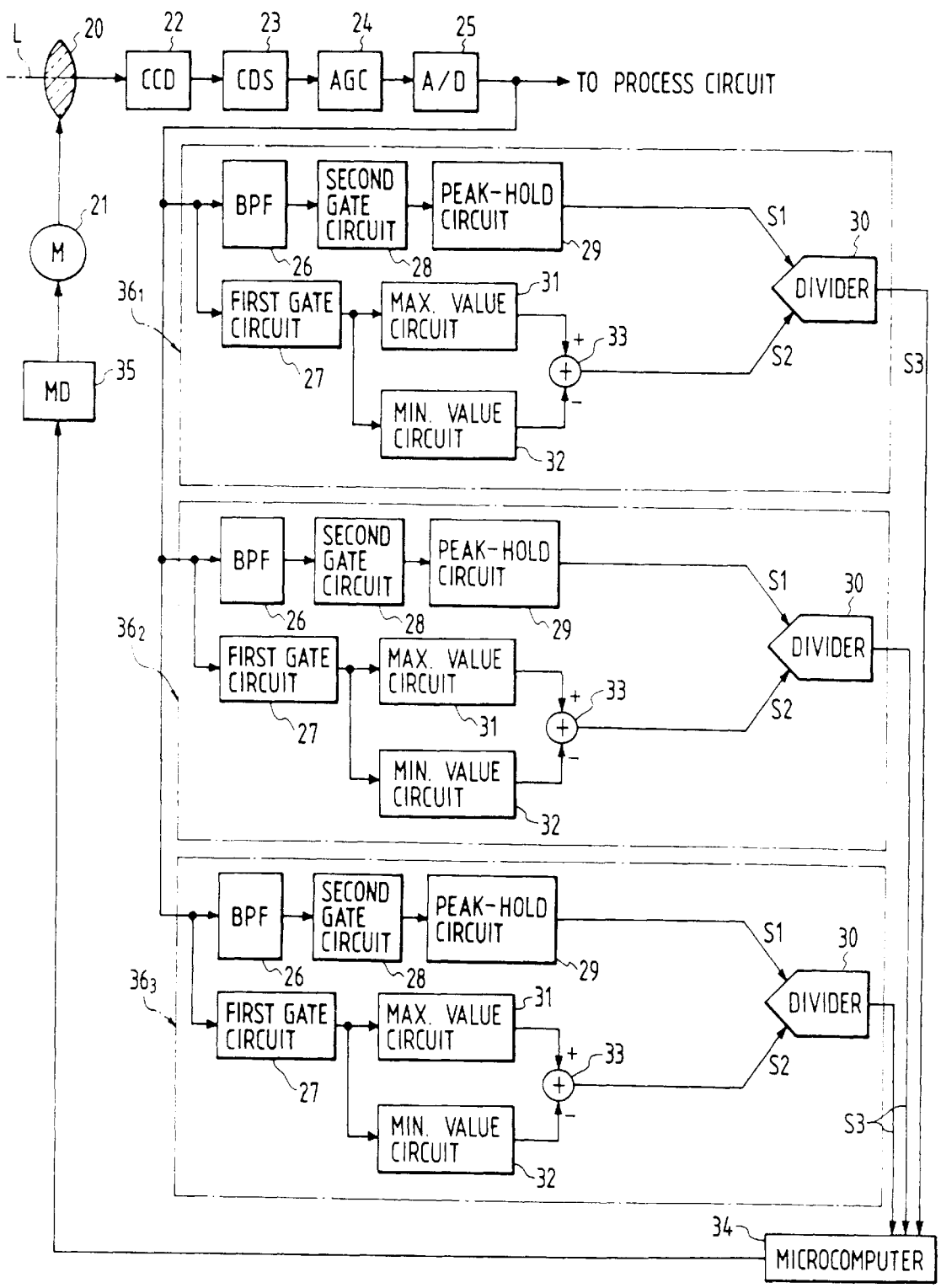
FIG. 5 is a block constructional diagram of a video camera according to the second embodiment of the invention.

FIG. 5 is a block constructional diagram of a camera according to the second embodiment of the present invention. According to the second embodiment, three second gate circuits 28 are provided in a picture plane as shown in FIG. 5 and three arithmetic operating circuits $36_1$, $36_2$, and $36_3$ similar to the arithmetic operating circuit 36 shown in FIG. 1 in the first embodiment are provided for every gate, thereby calculating a normalized automatic focus estimation value. The first operating circuit $36_1$ is an arithmetic operating circuit for an L gate in FIG. 5. Second and third operating circuits $36_2$ and $36_3$ are likewise arithmetic operating circuits for a C gate and an R gate in FIG. 5.

In the embodiment, since the focus estimation value calculating operation corresponding to each of L, C, and R gates is similar to those in the first embodiment mentioned above, its explanation will now be omitted. However, by providing the gates in the central portion and in the right and left portions thereof, the following judgment can be performed.

(1) In the case where similar in-focus estimation values are obtained from all of the L, C, and R filters, a size of object image has a size such that L, C, and R are combined. The focusing lens is driven on the basis of the focus estimation value as a result of a process to perform an averaging process or an adding process.

(2) When the focus estimation values of either one of L, C, and R is larger than those in the others, the focusing lens is driven or a weighting of the gate of a high focus evaluation value is increased on the basis of a gate signal of a high in-focus estimation value and the focusing lens is driven on the basis of the result of the respective gates.

(3) When the in-focus estimation values of the right and left R and L gates is high and the central portion is low, for example, an object image shows a center blank state as if two persons were standing in parallel and a background were seen from the space between those two persons. In such a case, the focusing lens is driven by using the in-focus estimation values of the L and R gates without using a central gate C.

In this manner, the focusing lens can be controlled in accordance with the photographing state and it is effective to prevent an erroneous operation. The above discriminating algorithm is shown in FIG. 11.

In the embodiment, three gates L, C, and R have been provided as a gate in the embodiments. However, the invention is not limited to them but three or more gates can be also applied.

Third Embodiment

A third embodiment of the invention will now be described hereinbelow with reference to FIG. 7.

In the embodiment, the same portions as those in the foregoing first embodiment are designated by the same reference numerals and will be explained.

In the third embodiment, in place of using the maximum value circuit 31 and minimum value circuit 32 in the first embodiment mentioned above, a line maximum value circuit 31', a line minimum value circuit 32' are used, and a V peak-hold circuit 37 is provided between the divider 30 and the adder 33. An arithmetic operating circuit 36' for gating is constructed by the band-pass filter 26, first gate circuit 27, second gate circuit 28, peak-hold circuit 29, divider 30, line maximum value circuit 31', line minimum value circuit 32', adder 33, and V peak-hold circuit 37.

In the above construction, in the signal supplied to the first gate circuit 27, the maximum value of one horizontal line is held by the line maximum value circuit 31' and the minimum value of one horizontal line is held by the line minimum value circuit 32'. The adder 33 subtracts the line minimum value from the line maximum value, thereby obtaining a difference between the line maximum value and the line minimum value. The difference between the maximum and minimum values of each line is peak-held by the V peak-hold circuit 37, thereby forming the signal $S_2$ in which the maximum value in the V period has been held. The signal $S_2$ is supplied to a denominator side terminal of the divider 30.

Since the other construction and operation in the third embodiment are substantially the same as those in the first embodiment, their descriptions are omitted here.

Fourth Embodiment

The fourth embodiment of the invention will now be described with reference to FIG. 8.

Figure 7:
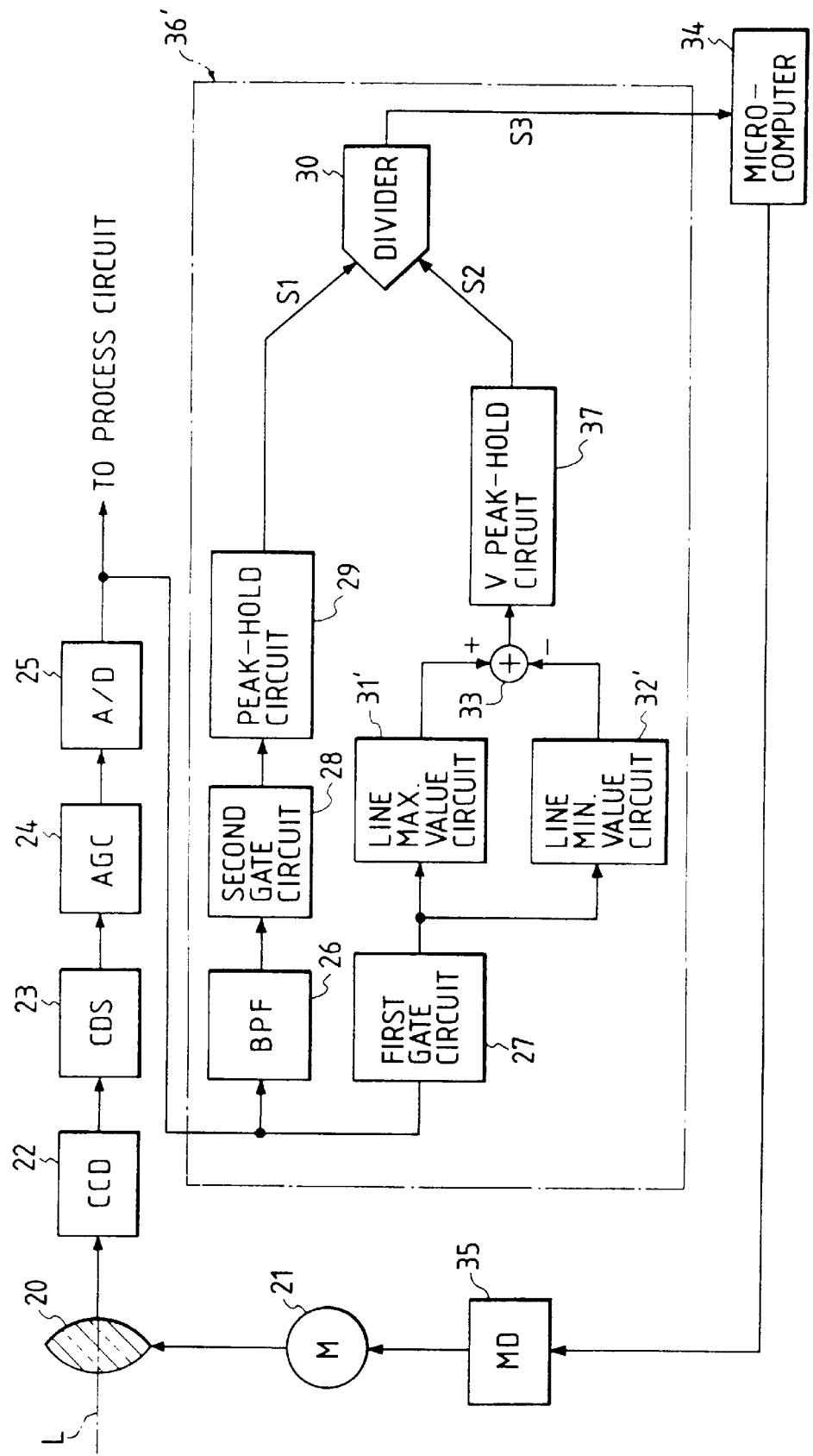
FIG. 7 is a block constructional diagram of a video camera according to the third embodiment of the invention.

In the fourth embodiment, the same portions as those in the third embodiment shown in FIG. 7 are designated by the same reference numerals and will be explained.

In the fourth embodiment, three second gate circuits 28 are provided in a picture plane as shown in FIG. 6 of the second embodiment. Arithmetic operating circuits $36_1'$, $36_2'$, and $36_3'$ similar to the arithmetic operating circuit 36' shown in FIG. 7 of the third embodiment are provided for every gate.

Since the other construction and operation of the fourth embodiment are substantially the same as those in the third embodiment, their descriptions are omitted here.

Fifth Embodiment

The fifth embodiment of the present invention will now be described with reference to FIG. 9.

In the fifth embodiment, the same portions as those in the third embodiment shown in FIG. 7 are designated by the same reference numerals and will be explained.

According to the fifth embodiment, a sample-hold circuit 38 is provided in place of the V peak-hold circuit 37 in the third embodiment. An arithmetic operating circuit 36" for gating is constructed by the band-pass filter 26, first gate circuit 27, second gate circuit 28, peak-hold circuit 29, divider 30, line maximum value circuit 31', line minimum value circuit 32', adder 33, and sample-hold circuit 38.

In the above construction, a holding pulse indicative of the horizontal line which has been peak-held by the peak-hold circuit 29 is supplied to the sample-hold circuit 38.

The sample-hold circuit 38 samples and holds the signal indicative of a difference between the maximum and minimum values of each line from the adder 33 at a generation timing of the holding pulse, thereby forming the signal $S_2$. The signal $S_2$ is sent to the denominator side terminal of the divider 30.

Since the other construction and operation of the fifth embodiment are similar to those in the third embodiment, their descriptions are omitted here.

Sixth embodiment

Figure 10:
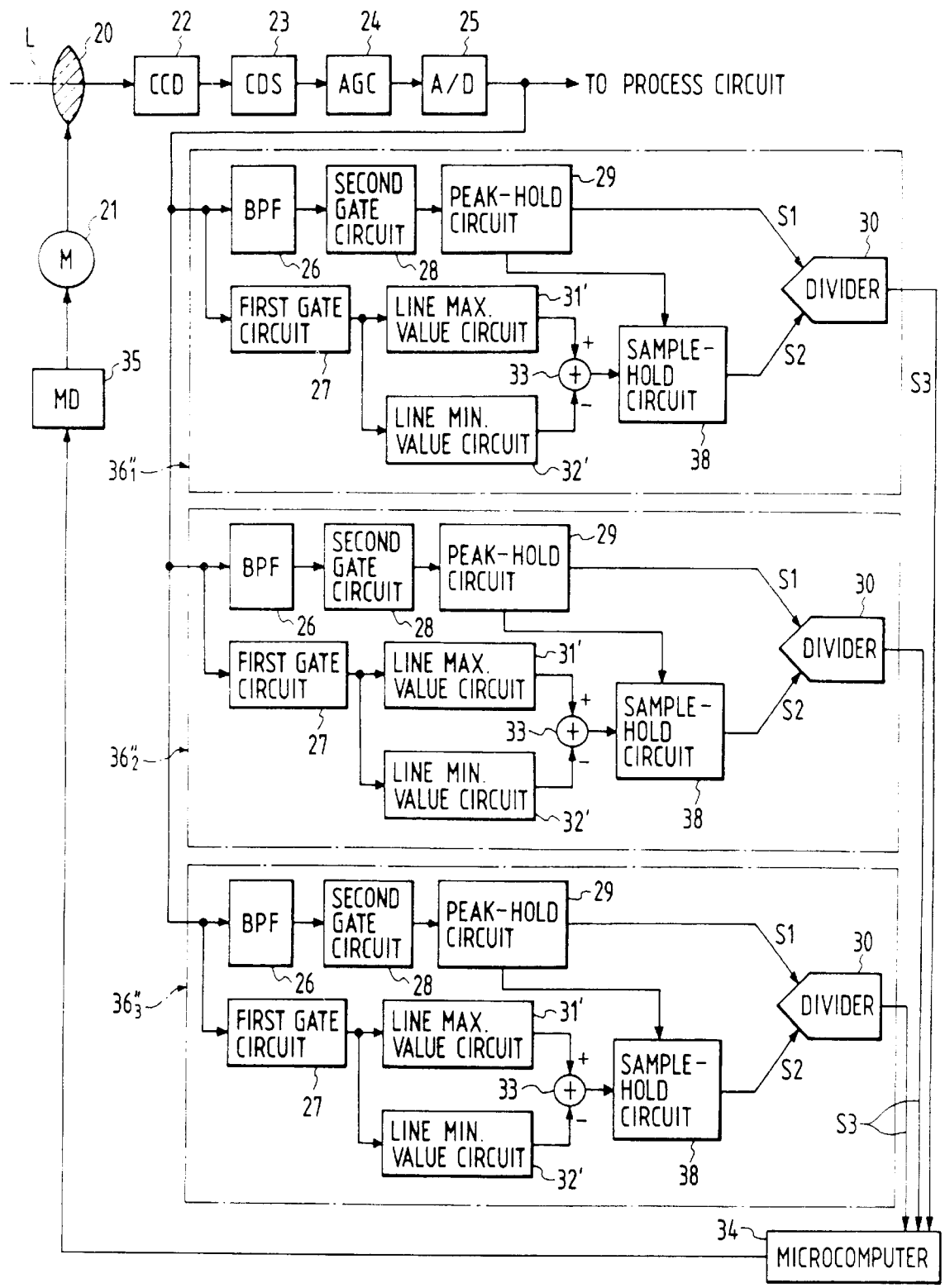
FIG. 10 is a block constructional diagram of a video camera according to the sixth embodiment of the invention.

The sixth embodiment of the invention will now be described with reference to FIG. 10.

Figure 9:
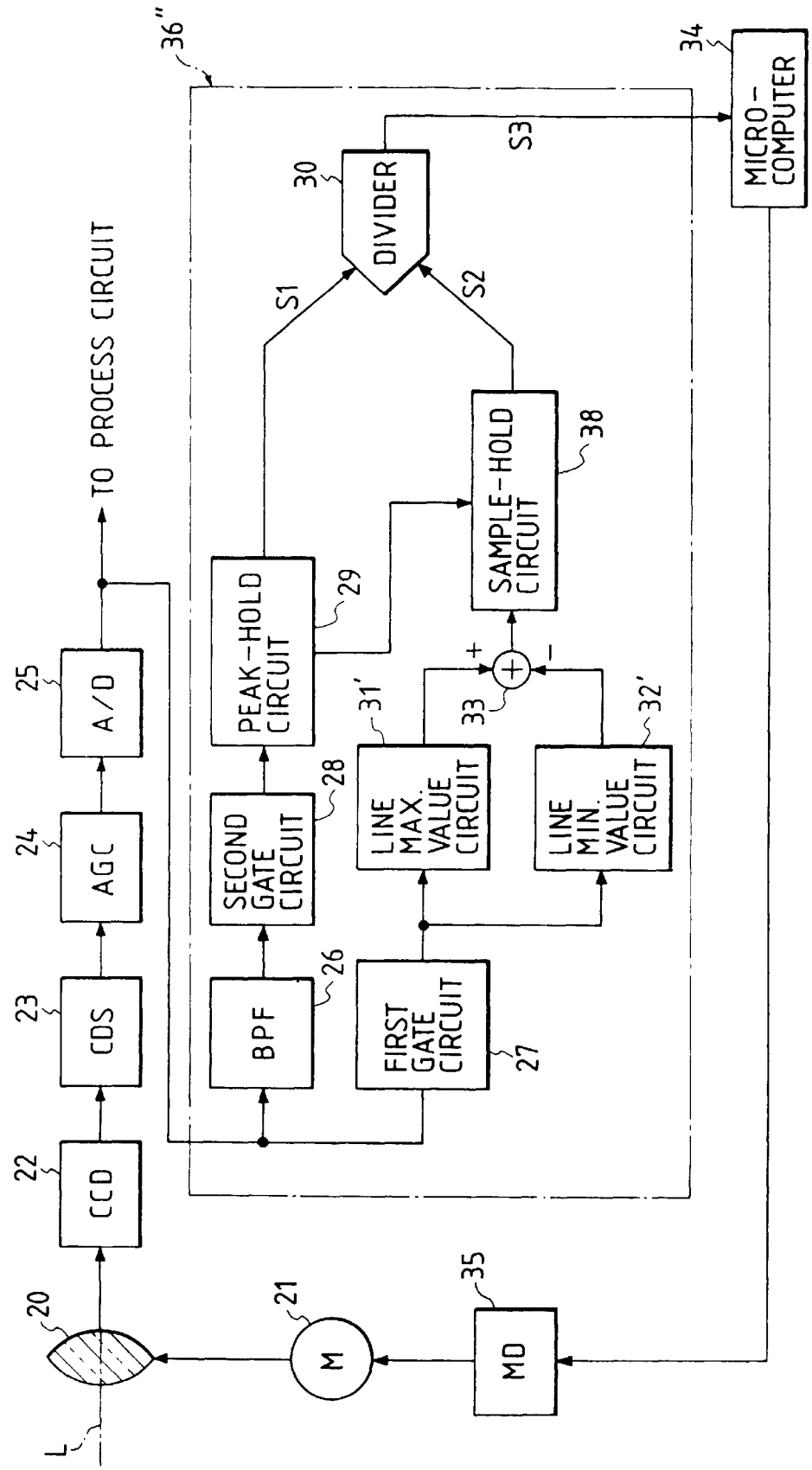
FIG. 9 is a block constructional diagram of a video camera according to the fifth embodiment of the invention

In the sixth embodiment, the same portions as those in the fifth embodiment shown in FIG. 9 are designated by the same reference numerals and will be explained.

Figure 8:
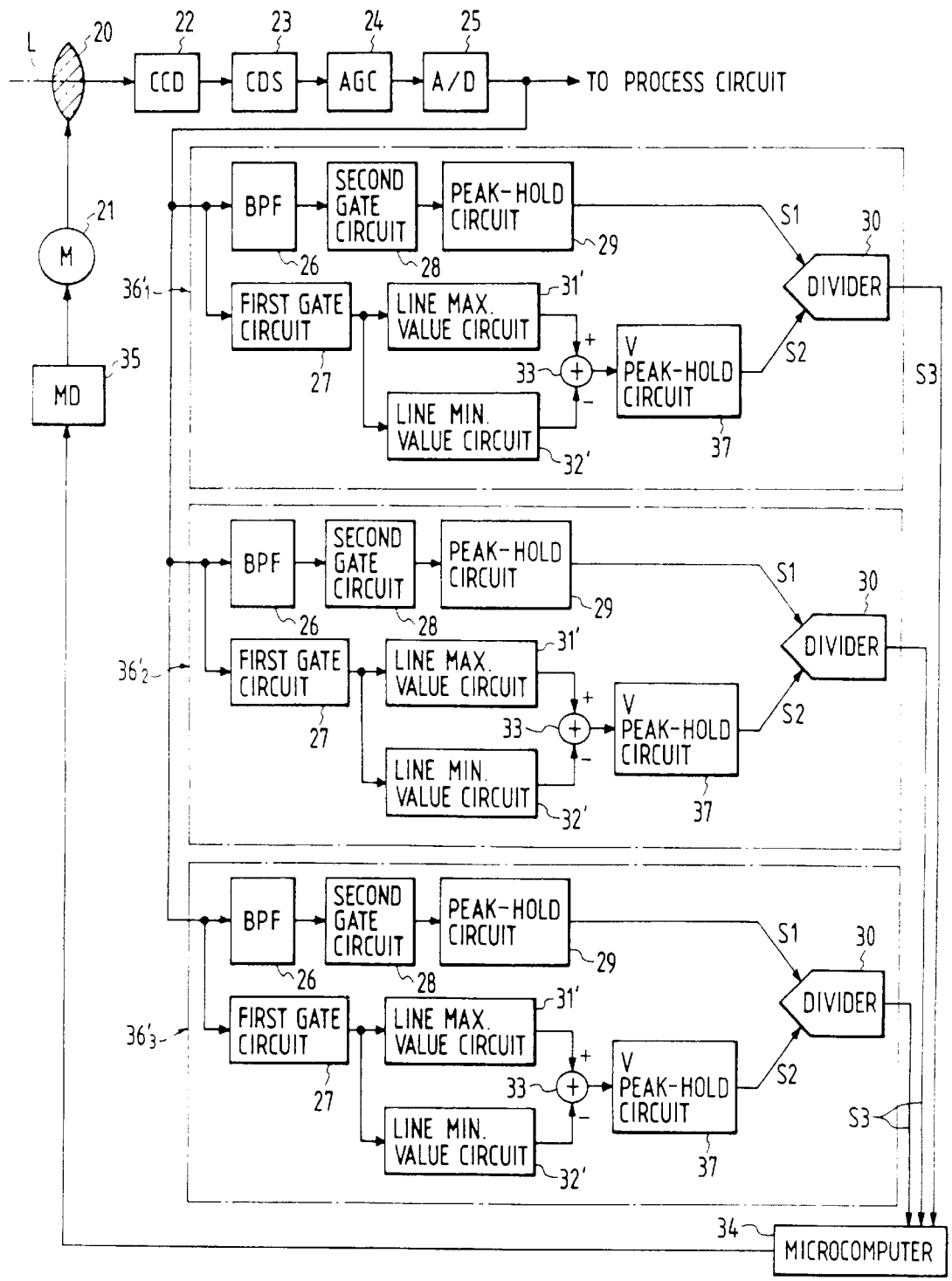
FIG. 8 is a block constructional diagram of a video camera according to the fourth embodiment of the invention.

According to the sixth embodiment, three second gate circuits 28 are provided in the picture plane as shown in FIG. 5 of the second embodiment and arithmetic operating circuits $36_1$", $36_2$", and $36_3$" similar to the arithmetic operating circuit 36" shown in FIG. 8 of the fifth embodiment are provided for every gate.

Since the other construction and operation of the sixth embodiment are similar to those of the fifth embodiment, their descriptions are omitted here.

According to the foregoing video camera as mentioned above, there is an effect such that even for any object, a quick and preferable automatic focus adjusting operation can be executed without causing a hunting.

What is claimed is:

1. An auto-focus adjusting apparatus comprising:
    area setting means for setting a plurality detection areas in a picture;
    extraction means for extracting a predetermined frequency component from image signals corresponding respectively to said plurality of detection areas; and
    control means for controlling a focusing condition based on a level of said predetermined frequency component extracted from each of said plurality detection areas by said extraction means, said control means using the whole of said plurality of detection areas as a focus detection area in the case that the levels of the predetermined frequency components extracted respectively from said plurality of detection areas are substantially equal to each other, and using the detection area from which the predetermined frequency component having the maximum level is extracted, as the focus detection area in the case that the levels of the predetermined frequency components of said plurality of detection areas are not equal to each other.

2. An apparatus according to claim 1, wherein said predetermined frequency component is a high frequency component of the image signal and said extraction means is a bandpass filter.

3. An apparatus according to claim 1, wherein said control means excludes the detection area whose predetermined frequency component has the level smaller than those of the predetermined frequency components of the other detection areas, from said plurality of detection areas.

4. An apparatus according to claim 1, wherein said plurality of detection areas includes at least three detection areas, one is a center area set at the center of the picture, another and the other are areas set at the right and left sides of said center area.

5. An apparatus according to claim 1, wherein said extraction means extracts a luminance signal level of the image signal.

6. An apparatus according to claim 5, further comprising means for normalizing said predetermined frequency component with respect to a signal level representing difference between the maximum and minimum values of said luminance signal level.

7. An apparatus according to claim 5, wherein an area from which the luminance signal level is detected, is larger than each of said plurality of detection areas.

8. An auto-focus adjusting apparatus comprising:
    area setting means for setting a plurality of detection areas including a center area set at the center of a picture and left and right areas set adjacent to the center area respectively;
    extraction means for extracting a first signal component from an image signal corresponding to each of said plurality of detection areas and extracting a second signal component from an area corresponding to the whole of said plurality of detection areas; and
    control means for calculating a focus evaluation value from said first and second signal components of each of said plurality of detection areas and controlling a focusing condition according to relationship between magnitudes of the focus evaluation values of said plurality of detection areas.

9. An apparatus according to claim 8, wherein said control means controls the focusing condition by using the whole of said plurality of detection areas as a focus detection area when the magnitudes of the focus evaluation values of said plurality of detection areas are substantially equal to each other, and uses the detection area whose focus evaluation value has the maximum magnitude, as the focus detection area when the magnitudes of the focus evaluation values of said plurality of detection areas are not equal to each other.

10. An apparatus according to claim 8, wherein said first signal component is a high frequency component of the image signal and said second signal component is difference between a maximum luminance level and a minimum luminance level.

11. An apparatus according to claim 9, wherein said control means excludes the detection area whose focus evaluation value has the magnitude smaller than those of the focus evaluation values of the other detection areas, from said plurality of detection areas.

* * * * *

UNITED STATES PATENT AND TRADEMARK OFFICE
CERTIFICATE OF CORRECTION

PATENT NO. : 6,067,115
DATED : May 23, 2000
INVENTOR(S) : Hirofumi Suda

It is certified that error appears in the above-identified patent and that said Letters Patent is hereby corrected as shown below:

Title page, item [54],
Column 1,
Lines 1-2, delete "AUTO-FOCUS ADJUSTING APPARATUS SUCH AS FOR A VIDEO CAMERA" and insert therefor -- AN AUTO-FOCUS ADJUSTING APPARATUS SUCH AS FOR A VIDEO CAMERA --

Column 3,
Line 20, "he" should read -- the --.
Line 45, "he" should read -- the --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*